United States Patent
Koelling

(10) Patent No.: US 9,677,589 B2
(45) Date of Patent: Jun. 13, 2017

(54) CINCH FASTENING DEVICE

(71) Applicant: Lockdowel, Inc., Fremont, CA (US)

(72) Inventor: Bryan Koelling, Fremont, CA (US)

(73) Assignee: Lockdowel, Inc., Fremont, CA (US)

( * ) Notice: Subject to any disclaimer, the term of this patent is extended or adjusted under 35 U.S.C. 154(b) by 0 days.

(21) Appl. No.: 14/613,333

(22) Filed: Feb. 3, 2015

(65) Prior Publication Data

US 2015/0219137 A1    Aug. 6, 2015

Related U.S. Application Data

(60) Provisional application No. 61/935,326, filed on Feb. 3, 2014.

(51) Int. Cl.
*F16B 19/00* (2006.01)
*F16B 21/08* (2006.01)

(52) U.S. Cl.
CPC .......... *F16B 19/002* (2013.01); *F16B 21/082* (2013.01); *F16B 2019/006* (2013.01); *Y10T 29/49876* (2015.01)

(58) Field of Classification Search
CPC ........ F16B 17/00; F16B 19/00; F16B 19/002; F16B 21/084; F16B 21/086; F16B 2019/006; Y10T 29/49876
USPC .......................................... 411/508–509, 510
See application file for complete search history.

(56) References Cited

U.S. PATENT DOCUMENTS

| | | | |
|---|---|---|---|
| 3,527,486 A * | 9/1970 | Gamp | F16B 12/24 403/11 |
| 3,736,834 A | 6/1973 | MacDonald | |
| 3,740,083 A * | 6/1973 | Zenhausern | E06C 9/04 403/243 |
| 3,832,931 A | 9/1974 | Talan | |
| 3,966,339 A * | 6/1976 | Nemecek | F16B 12/24 403/292 |
| 4,454,699 A * | 6/1984 | Strobl | F16B 21/082 403/298 |
| 4,826,379 A * | 5/1989 | Norden | F16B 37/0842 411/414 |

(Continued)

OTHER PUBLICATIONS

International Search Report, mailing date of Aug. 28, 2015, for corresponding International Application No. PCT/US2015/014336.

(Continued)

*Primary Examiner* — Roberta Delisle
(74) *Attorney, Agent, or Firm* — Intellectual Property Law Group LLP

(57) ABSTRACT

A fastening device and method thereof is described. According to an embodiment of the present invention there is a fastening device comprising an insertion component and a receptacle component. The insertion component and the receptacle component, each includes a barbed outer surface. The insertion component comprises two sections of its barbed outer surface, separated by a flange, such that one section of the insertion components is configured to be inserted inside the receptacle component. A method of fastening a first substrate to a second substrate using a fastening device according to an embodiment is provided comprising pushing the insertion component into a hole in the first substrate, pushing the receptacle component into a hole in the second substrate, and pushing the insertion component into the receptacle component.

20 Claims, 9 Drawing Sheets

(56) References Cited

U.S. PATENT DOCUMENTS

| | | | |
|---|---|---|---|
| 4,850,771 A | | 7/1989 | Hurd |
| 5,685,682 A | * | 11/1997 | Glime .................. F16B 21/082 |
| | | | 411/510 |
| 5,772,551 A | * | 6/1998 | Mabie ...................... F16G 3/00 |
| | | | 24/33 P |
| 6,176,662 B1 | * | 1/2001 | Champney .......... F16B 19/1045 |
| | | | 411/171 |
| 6,442,806 B1 | * | 9/2002 | Wesson ..................... F16B 2/06 |
| | | | 24/16 PB |
| 6,517,543 B1 | * | 2/2003 | Berrevoets ............. A61B 17/68 |
| | | | 411/324 |
| 6,520,461 B1 | | 2/2003 | Graham |
| 6,520,704 B1 | * | 2/2003 | Vidmar ................. F16B 21/084 |
| | | | 248/250 |
| 7,004,699 B2 | | 2/2006 | Petrok et al. |
| 7,264,431 B2 | * | 9/2007 | Trueb ................... F16B 21/082 |
| | | | 411/455 |
| 8,511,962 B2 | * | 8/2013 | Schuech ............... F16B 21/082 |
| | | | 411/388 |
| 2012/0089197 A1 | | 4/2012 | Anderson |

OTHER PUBLICATIONS

Written Opinion of the International Searching Authority, mailing date of Aug. 28, 2015, for corresponding International Application No. PCT/US2015/014336.

* cited by examiner

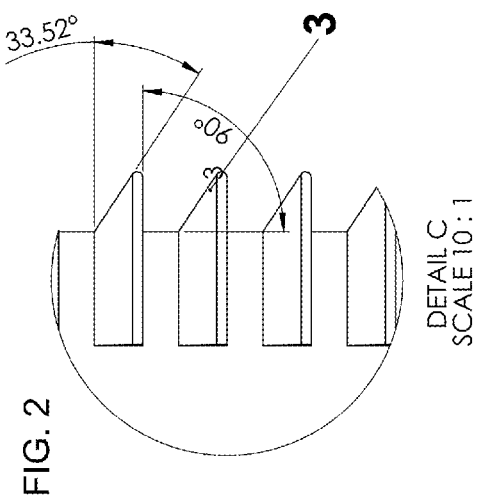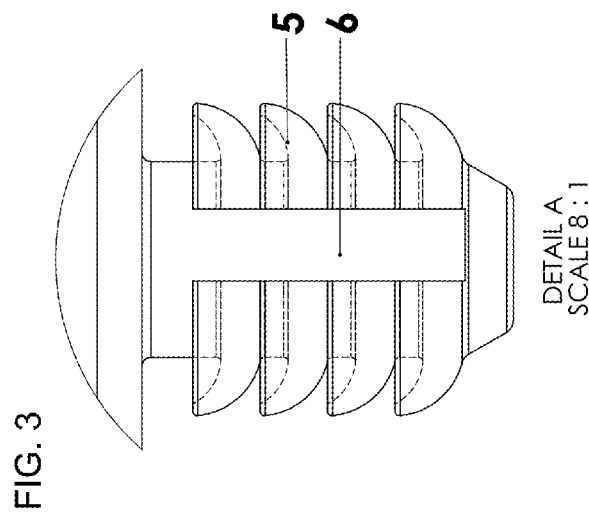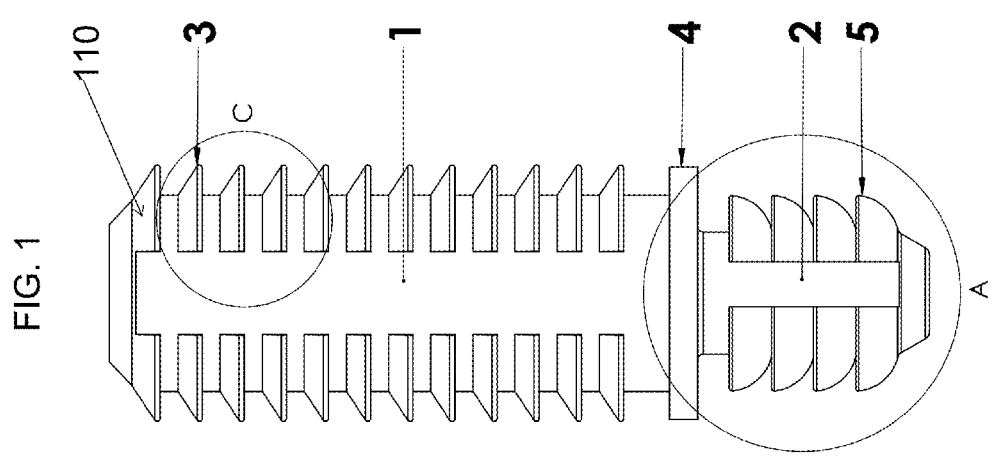

CINCH FASTENING DEVICE

CROSS-REFERENCE TO RELATED APPLICATION

This application claims the benefit of U.S. Provisional Application No. 61/935,326, filed Feb. 3, 2014, which is hereby incorporated by reference in its entirety.

BACKGROUND OF THE INVENTION

1. Field of the Invention

Aspects of the present invention relate to a device for and method of fastening two substrates. In particular, there is a two part fastener having complementary male and female counter parts. It also pertains to fasteners that use in one format or another, barbs designed with certain critical angles of entry and egress as the pertinent fastening element.

2. Background

Furniture, cabinets and other like items are typically shipped from the factory fully assembled. Many times these factories are located at a great distance from the customer and thus shipping represents a significant (20% to 25%) portion of the overall cost of the product. Even where products are shipped in ready to assemble components, existing fastening components do not represent the same look nor provide the same sturdiness as fully assembled products. Moreover, existing fastener components can be quite complex to apply and excessive in number of pieces. This often leads to user errors in assembling the product, improper fastening and connecting pieces, connection misalignment, missing pieces and overall frustration.

Accordingly, there is a need for a fastening device and method that can reduce considerably the cost of shipping while allowing for fast and easy assembly at the point of sale. There is a further need in that assembly must be fast (cost effective) and have an equal sturdiness and look as compared to factory assembled items.

SUMMARY OF THE INVENTION

Objects of invention described herein is an all plastic fastening device having both a male pin and corresponding female latch housing (receptacle), according to an embodiment of the present invention.

According to an embodiment of the present invention, the fastening device is permanent and cannot be removed or tampered with after installation, thereby providing for a highly secure and stable connection.

According to an embodiment of the present invention, male pin insertion component and the female latch housing, each comprises a plurality of semi-circular barbs around its perimeter for insertion into a respective substrate. The substrates, for example may comprise two separate furniture pieces.

According to an embodiment of the present invention, the male pin comprises an insertion section for entry into a female latch housing, the insertion section having a plurality of barbs around its perimeter for engaging with the female latch housing. In embodiments, the plurality of insertion section barbs are umbrella shaped barbs configured to engage past an interference edge on an inside of the female latch housing.

The barb configuration for both the male pin and the female latch housing which are inserted into substrates, are identical in structure, according to an embodiment of the present invention.

According to an embodiment of the present invention there is a fastening device comprising an insertion component and a receptacle component. The insertion component includes a shaft or a cylindrical body with two sections, a first barbed surface along the outer perimeter of the first section of the body, and a second barbed surface along the outer perimeter of the second section. The two sections are divided by a flange. The receptacle component includes a body having a receptacle barbed surface along its outer perimeter, similar to the first barbed surface. The receptacle component includes an inner diameter for receiving the second section of the insertion component. The second barbed surface is configured to be pushed into the receptacle such that each surface layer of the second barbed surface moves past an internal ledge of the receptacle component for complete engagement, wherein an upper surface of the receptacle component rests against a bottom surface of the flange.

In another embodiment of the present invention there is a method of fastening a first substrate to a second substrate using a fastening device, the fastening device comprising an insertion component and a receptacle component. The insertion component includes a shaft with two sections, a first barbed surface along the outer perimeter of the first section of the body, and a second barbed surface along the outer perimeter of the second section. The two sections are divided by a flange. The receptacle component includes a body having a receptacle barbed surface along its outer perimeter, similar to the first barbed surface. The receptacle component includes an inner diameter for receiving the second section of the insertion component. The method includes pushing the insertion component into a hole in the first substrate, the flange and the second section configured to remain outside the hole in the first substrate; pushing the receptacle component into a hole in the second substrate; and engaging the second section into the receptacle component, such that each of a plurality of surface layers of the second barbed surface is configured to collapse, moving past an internal ledge of the receptacle component, and unfolds, and an upper surface of the receptacle component rests against a bottom surface of the flange. Each surface layer of the second barbed surface moves past the internal ledge of the receptacle component for complete engagement.

These features, advantages and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

FIG. 1 illustrates a front view of an insertion pin of the fastening device, according to an embodiment of the present invention.

FIG. 2 illustrates an enlarged detail-view from FIG. 1, according to an embodiment of the present invention.

FIG. 3 illustrates another enlarged detail-view from FIG. 1, according to an embodiment of the present invention.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

Figure 4:
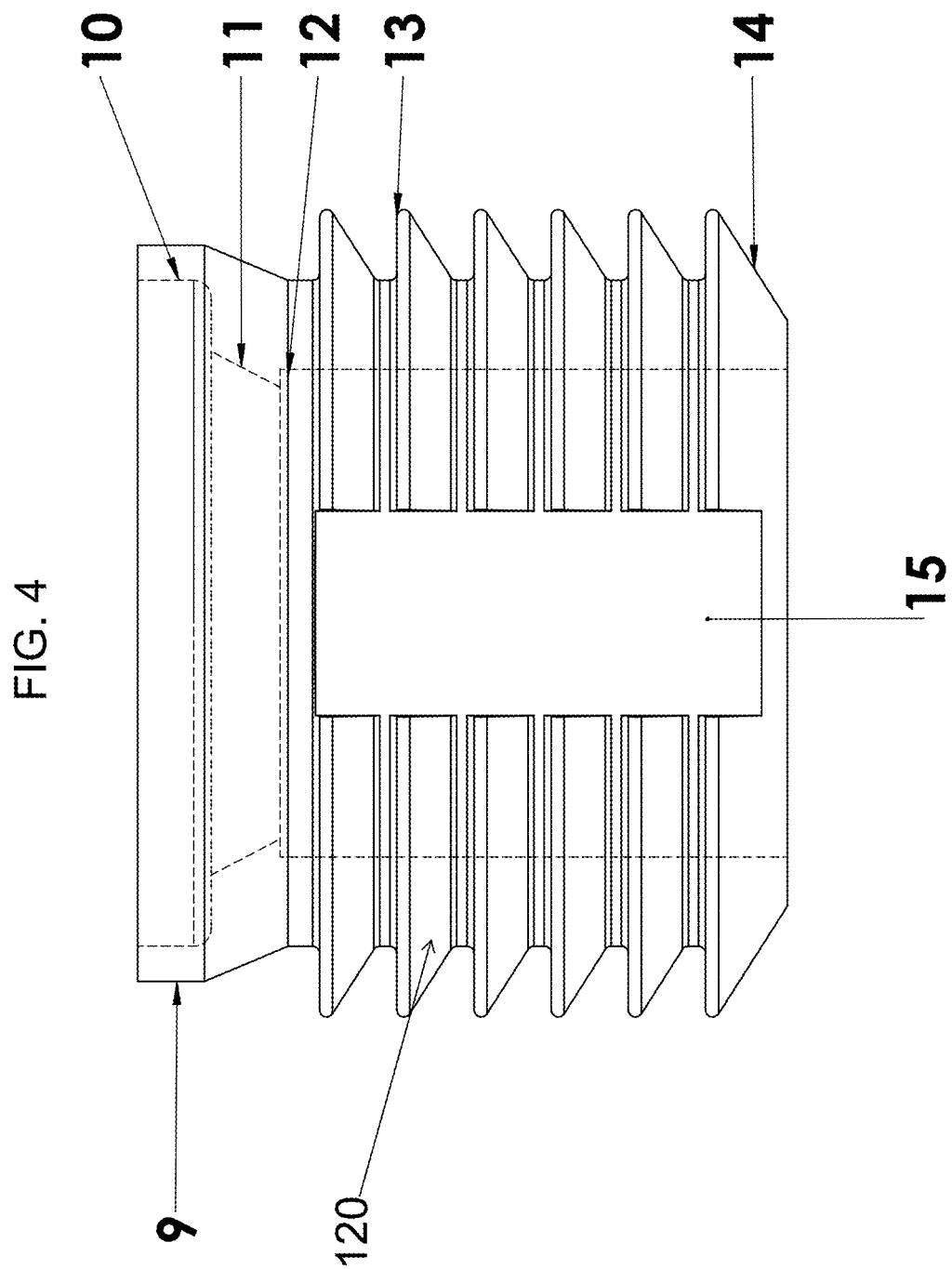
FIG. 4 illustrates a front view of the receptacle of the fastening device, with a partial cross-sectional view, according to an embodiment of the present invention.

An embodiment of the invention is described in FIGS. 1-12. FIG. 1 illustrates an embodiment of the male pin component 110 which serves as the insertion component of the fastening device 100. The male pin 110 is divided into two separate sections. The top section 1 of the male pin 110 is that portion that enters a hole drilled into a substrate thus leaving the bottom section 2, outside of the hole and available for insertion into a female latch housing 120 as illustrated in FIG. 4. The female latch housing 120 serves as the receptacle component.

The top section 1 has a plurality of semicircular barbs 3 around the perimeter of the male pin 110, used for securing the male pin 110 into the substrate. It is critical that the anterior angle of the barbs 3 be in ratio with the overall thickness and length of the barb such that the flex angle of the barb after placement into a drilled hole is approximately 45 degrees. See FIG. 2 which further illustrates the barb configuration in detail view. This angle is considered optimal to obtain maximum holding strength after placement into the drilled hole. The barb configuration 3 for the male pin 110 and the barb configuration 13 for the female latch housing 120 are identical in structure, as further illustrated in FIG. 4.

The bottom section 2 of the male pin 110 is separated from the top section 1 by a spacer 4 or flange that prevents the top section 1 from penetrating too far down into the substrate. A plurality of umbrella shaped semicircular barbs 5 extends away from the spacer 4. The step distance between the umbrella shaped barbs 5 is critical to the accuracy of operation of the fastening device 100.

Figure 5:
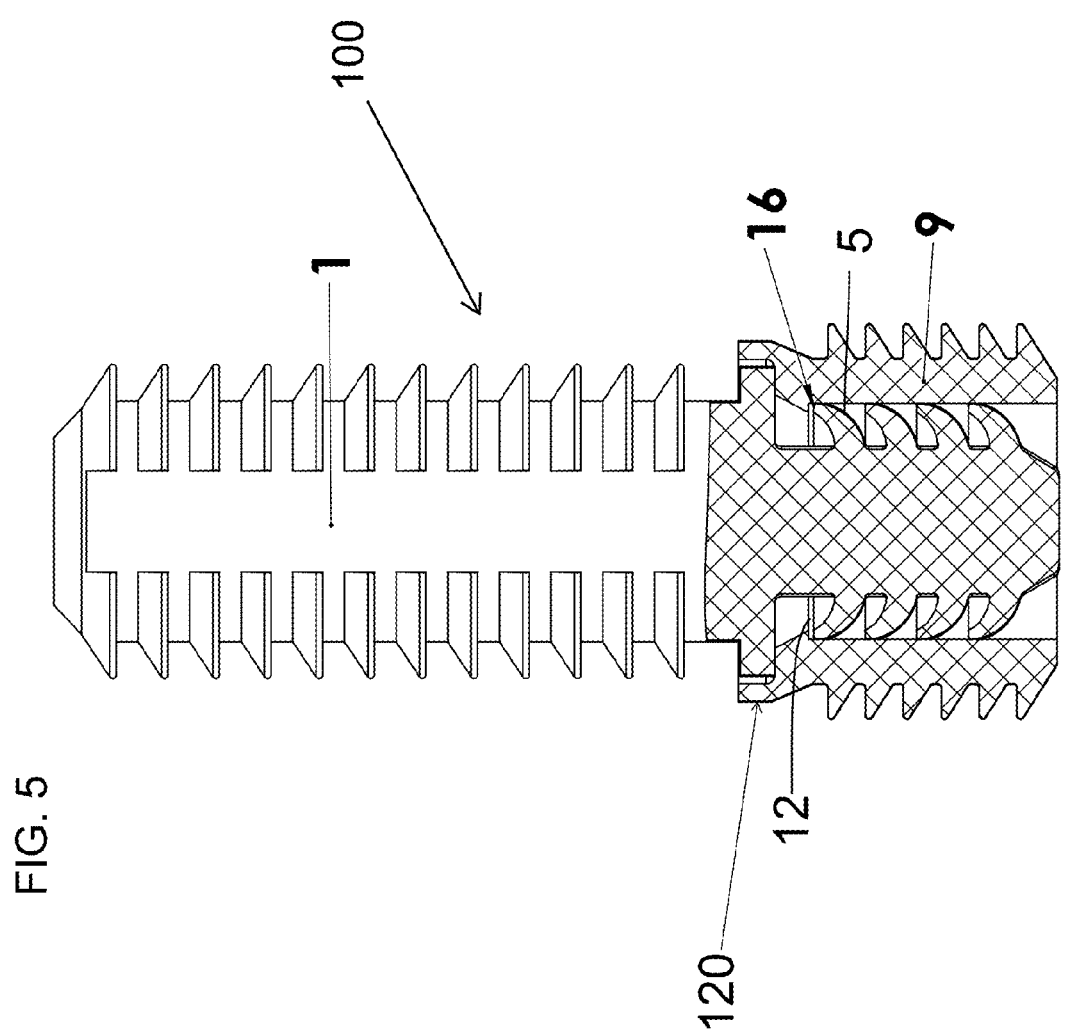
FIG. 5 illustrates the insertion pin of FIG. 1 engaged with the receptacle, and with the receptacle in cross-sectional view, according to an embodiment of the present invention.

As illustrated in FIG. 5, to maximize the holding strength of the umbrella barbs 5, the barbs 5 are curved upward with the leading edge 16 parallel to the interference edge 12 located in the female latch housing 120. The large curvature angle of the umbrella shaped barbs 5 allows for minimum insertion force required for entry into the female latch housing 120.

As shown in the detail view of FIG. 3, a flat section 6 located between the semicircular barbs 5 allows the barbs to move inward and collapse during insertion into the female latch housing 120. The ramp angle 11 on the inside of the female latch 120 gradually allows the umbrella shaped barbs 5 to fold up during entry.

After the barbs 5 have entered the female housing 120 and move below the latching ledge 12 the umbrella shaped barbs 5 unfold. After unfolding they cannot move back out and away from the latching ledge 12 without catastrophic destruction to the fastener. The female latch housing 120, has corresponding outer barbs 13 in similitude to the barbs 3 on the upper section 1 of the male pin 110. The fastening attributes of these barbs 13 correspond exactly to the same principles of operation as those barbs 3 on the male pin 110.

As further illustrated in FIG. 4, similar to the male pin 110, the female latch housing 120 has a flat section 15 dividing the barbs 13 into two semicircular halves. This gives greater flexibility to the barbs 13 as they move into position into the drilled holes located in the substrate. The female latch housing 120 is designed with a chamfer 14 to ease insertion and help with location into the drilled hole. After the male pin 110 has been fully inserted into the female latch housing 120 the circular spacer 4 moves into a holding pocket 10 allowing additional stability to the overall latching operation.

The forces for both insertion and desertion can be altered by simply changing the angle of incidence of the umbrella barbs 5 and/or the material thickness of the barb 5 itself. As noted, the configuration of the barbs 5 and receptacle 120 further provide for the fastening device to be permanent and preventing removal or tampering with after installation.

Figure 6:
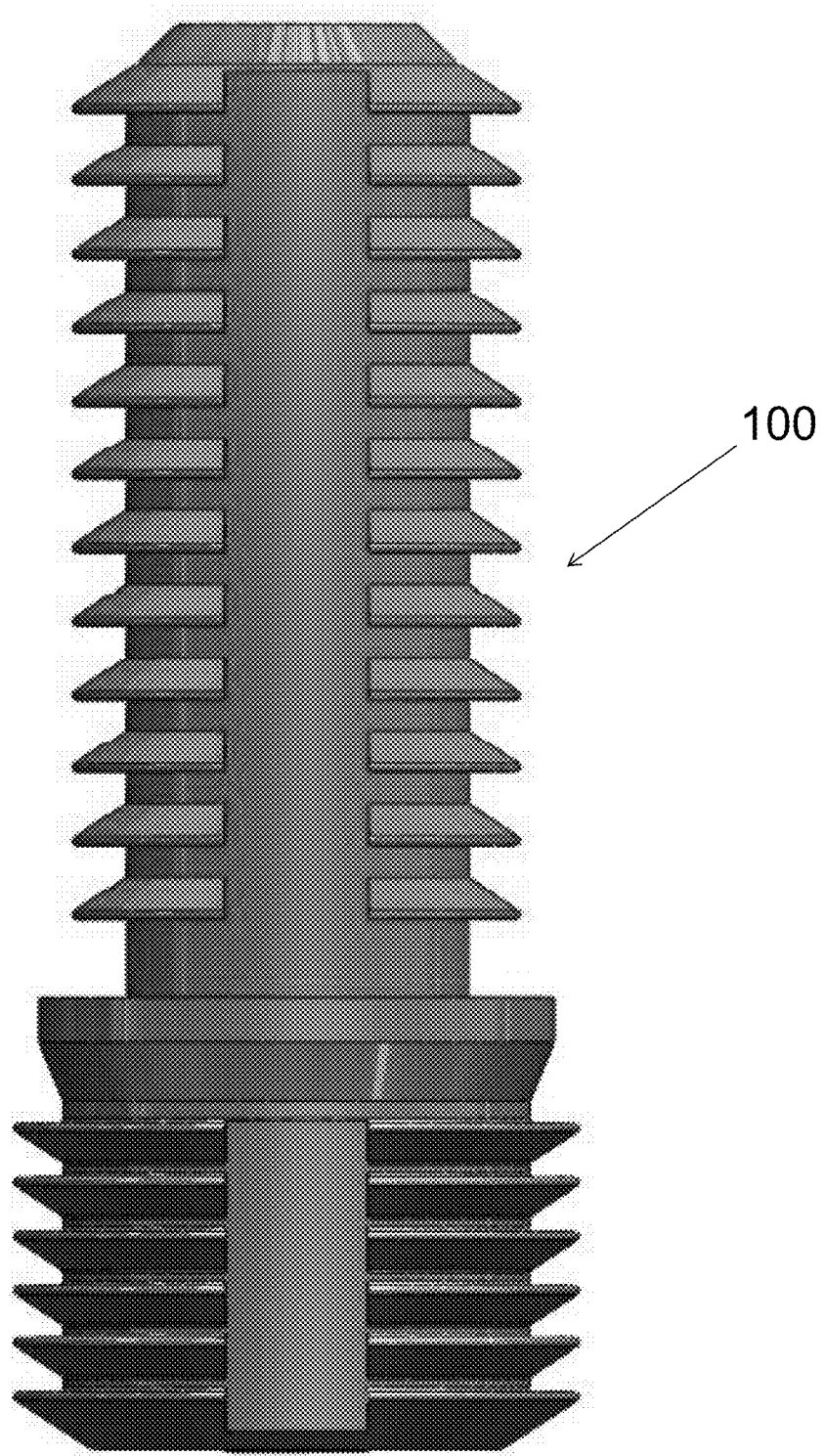
FIG. 6 illustrates a view of the fastening device with the insertion pin and receptacle in an engaged position, according to an embodiment of the present invention.
Figure 7:
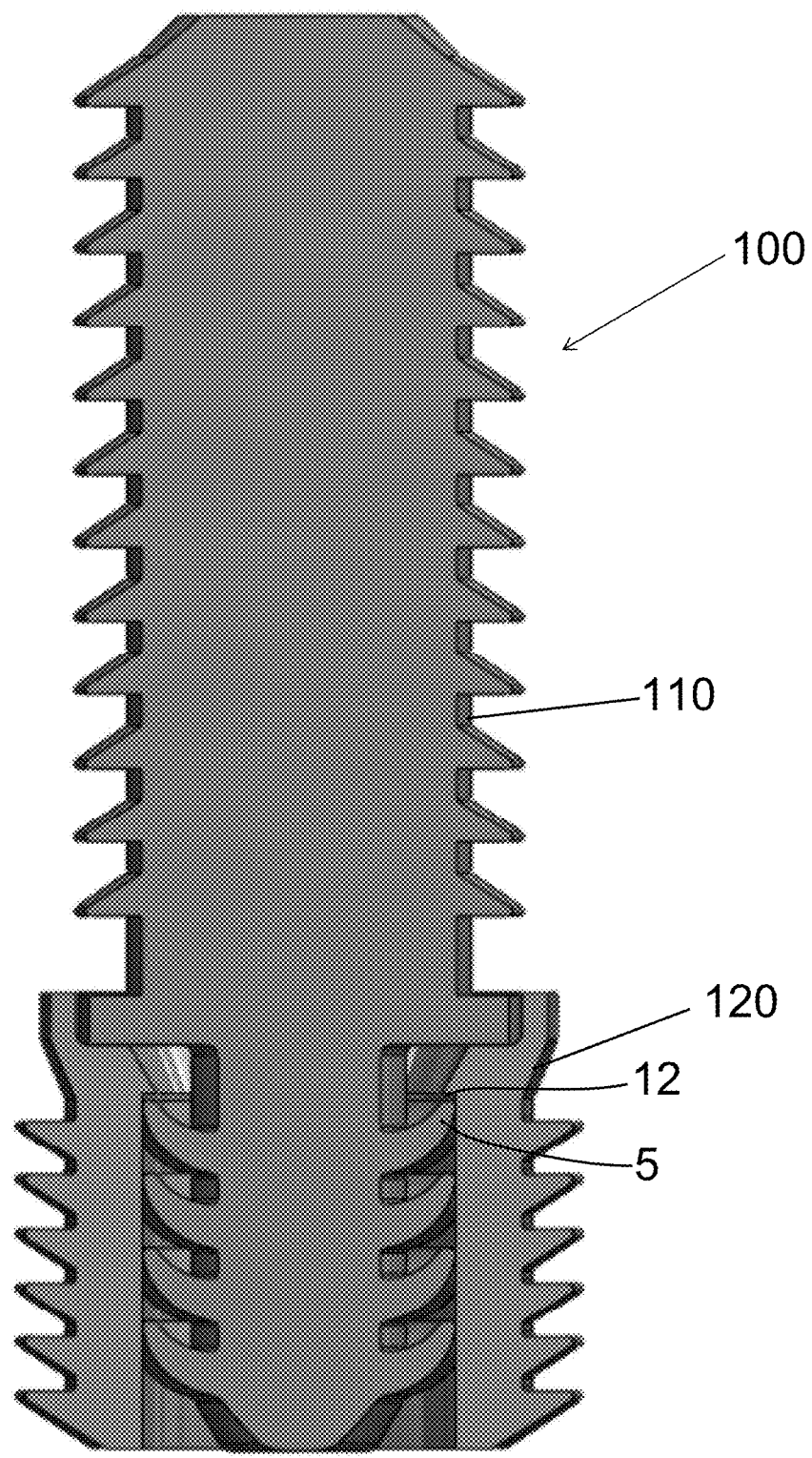
FIG. 7 illustrates a cross-sectional view of the device of FIG. 6, according to an embodiment of the present invention.

As shown in FIG. 6 and the cross-section of FIG. 7, the cinch fastening device is shown in an engaged position, with the male insertion component 110 inserted and engaged with the female receiving component 120. Upon engagement, as each level of the barbs 5 are pushed past the interference edge 12, an audible indication and/or manually sensed 'click' may be noticed. In an embodiment in which there are four layers of barbs 5, the engagement can be discerned by four 'clicks'. The multi-layer barb 5 design further improves the assembly process, by reducing manual connection errors, facilitating alignment in connecting two pieces of construction, and serving to avoid load failure. The fastening device, once engaged, provides for an extremely secure connection.

Figure 8:
FIG. 8 illustrates a perspective exploded assembly view of the device of FIG. 6, according to an embodiment of the present invention.
Figure 9:
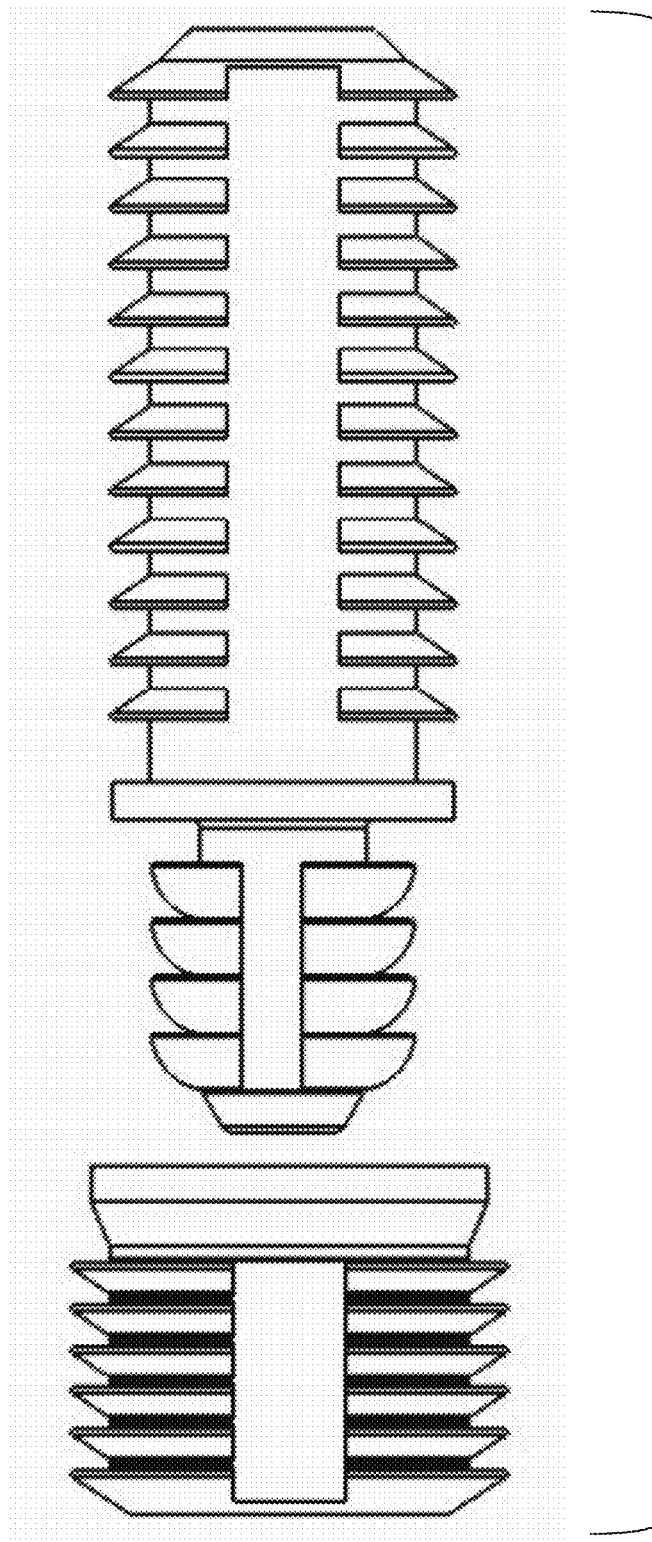
FIG. 9 illustrates an elevational exploded view of the device, according to an embodiment of the present invention, according to an embodiment of the present invention.

FIG. 8 shows an exploded perspective view of the fastening device 100. FIG. 9 similarly illustrates an exploded elevational view of the fastening device.

Figures 10, 11:
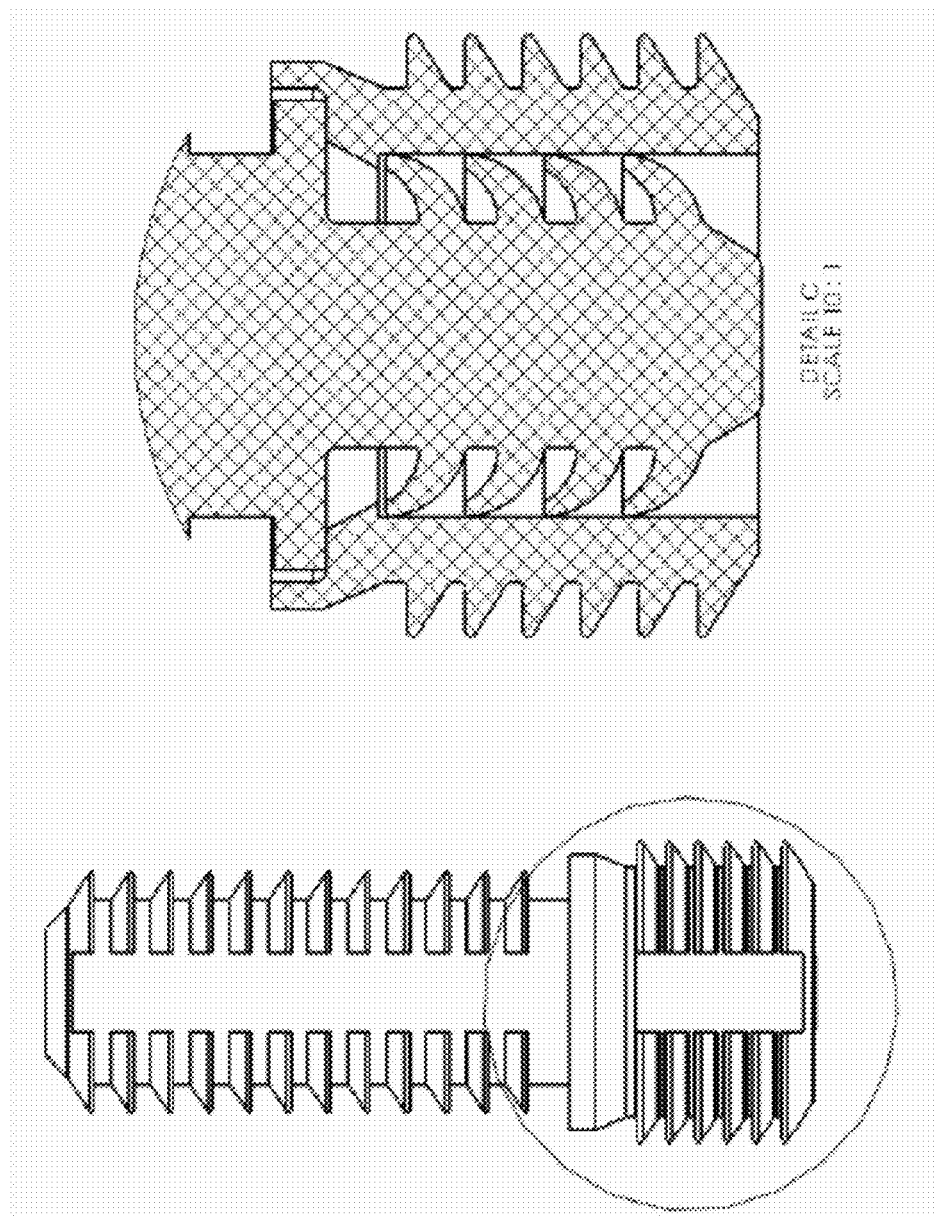
FIG. 10 illustrates another view of the device in an engaged position, according to an embodiment of the present invention.
FIG. 11 illustrates another enlarged cross-sectional detailed view of the insertion pin engaged with the receptacle, according to an embodiment of the present invention.

FIG. 10 again illustrates the fastening device 100 and FIG. 11 illustrates an enlarged detail-view in cross-section of the insertion pin 110 engaged with the latch housing 120.

Figure 12:
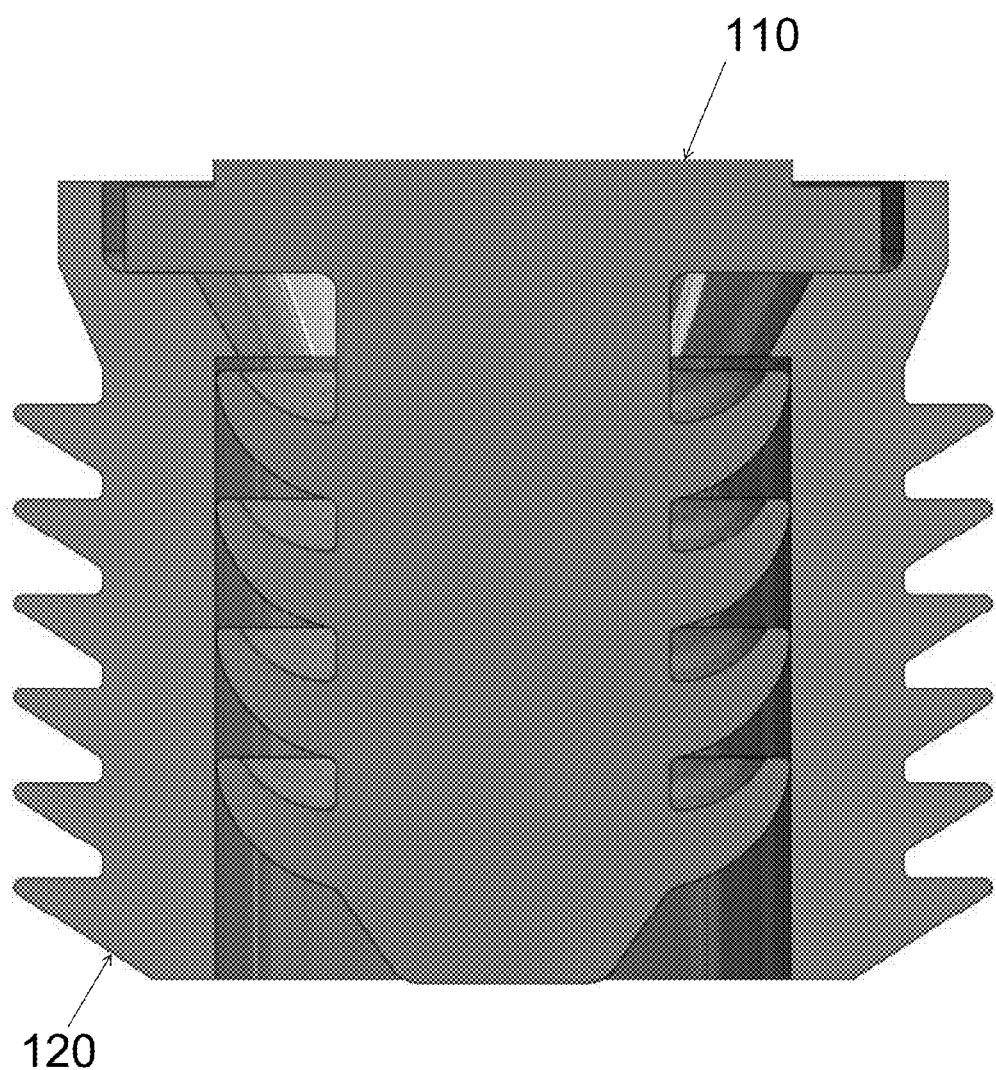
FIG. 12 illustrates another enlarged cross-sectional detail view of the receptacle engaged with the insertion pin, according to an embodiment of the present invention.

As further illustrated in FIG. 12, there is a cross-sectional view of the portion of the male pin component 110 engaged with the female latch housing 120.

The material of the fastening device 100 is manufactured of an entirely plastic (polymer) piece. Other polymer like materials, having similar weight and strength characteristics to the plastic may be used. The fastening device, according to an embodiment, may support a pull force of at least 60 pounds.

Having described some embodiments of the fastening device, a method according to an embodiment of the present invention with respect to use of the fastening device is described as follows. There is a method of fastening a first substrate to a second substrate using a fastening device, the fastening device comprising an insertion component and a receptacle component, the insertion component includes a shaft, for example, a cylindrical body with two sections, a first barbed surface along the outer perimeter of the first section of the body, and a second barbed surface along the outer perimeter of the second section, and the two sections are divided by a flange. The receptacle component includes a body having a receptacle barbed surface along its outer perimeter, similar to the first barbed surface; and an inner diameter for receiving the second section of the insertion component. The method comprises pushing the insertion component into a hole in the first substrate, the flange and the second section configured to remain outside the hole in the first substrate; pushing the receptacle component into a hole in the second substrate; and engaging the second section into the receptacle component, such that each of a plurality of surface layers of the second barbed surface is configured to collapse, move past an internal ledge of the receptacle component, and unfold, and an upper surface of the receptacle component rests against a bottom surface of the flange. By applying manual pressure, each surface layer of the second barbed surface moves past the internal ledge of the receptacle component for complete engagement.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

What is claimed is:

1. A fastening device comprising:
an insertion component and a receptacle component;
the insertion component having
a cylindrical body with two sections, with a first barbed surface along an outer perimeter of the first section and a second barbed surface along an outer perimeter of the second section, the two sections divided by a flange; and
the receptacle component having
a cylindrical body having a receptacle barbed surface along its outer perimeter;
an internal ledge; and
an inner diameter for receiving the second section of the insertion component, the inner diameter after the internal ledge being constant in diameter along an entire length of the second barbed surface of the second section;
wherein the second barbed surface of the second section configured to be pushed into the receptacle such that each of a plurality of surface layers of the second barbed surface moves past the internal ledge of the receptacle component for complete engagement, such that an upper surface of the receptacle component rests against a bottom surface of the flange.

2. The fastening device according to claim 1, wherein the receptacle barbed surface is similar in profile to the first barbed surface of the insertion component, wherein as the insertion component and receptacle component are positioned for engagement, the receptacle barbed surface profile is in reverse direction to that of the first barbed surface.

3. The fastening device according to claim 1, the first barbed surface and the receptacle barbed surface each having a plurality of barbs, wherein the plurality of barbs on the first barbed surface are identical in structure to the plurality of barbs on the receptacle barbed surface.

4. The fastening device according to claim 1, wherein the first barbed surface, the second barbed surface, and the receptacle barbed surface each having a plurality of semi-circular barbs.

5. The fastening device according to claim 4, wherein the semi-circular barbs on each of the first barbed surface, the second barbed surface and the receptacle barbed surface are split into two sets of semi-circular barbs along a lengthwise direction of their respective cylindrical bodies; and each of the two sets of semi-circular barbs are spaced apart by a flat surface section such that two flat surface sections are positioned on each of the cylindrical bodies.

6. The fastening device according to claim 1, wherein the second barbed surface comprises a plurality of umbrella shaped semi-circular barbs.

7. The fastening device according to claim 6, wherein each of the plurality of umbrella shaped semi-circular barbs having an upward curve with a leading edge, such that the leading edge is configured to be parallel to the internal ledge of the receptacle component.

8. The fastening device according to claim 1, wherein the inner diameter of the receptacle component comprises an angled section, such that when the second barbed surface is pushed into the receptacle, the second barbed surface moves past the angled section before reaching the internal ledge positioned after the angled section, wherein the angled section is configured such that as the second barbed surface moves past the angled section, the inner diameter reduces along the angled section.

9. The fastening device according to claim 8, wherein the inner diameter enlarges after the angled section.

10. The fastening device according to claim 1, wherein the device is made of a polymer.

11. The fastening device according to claim 1, wherein the insertion component and the receptacle component are each comprised entirely of a molded polymer.

12. The fastening device according to claim 1, wherein the receptacle component further comprises a holding pocket beginning from a top surface of the receptacle component to receive and support the flange as the second section completely engages into the receptacle component, and wherein the receptacle component terminates with a beveled end surface.

13. A fastening device comprising:
an insertion component and a receptacle component;
the insertion component having
a shaft with two sections, with a first barbed surface along an outer perimeter of the first section and a second barbed surface along an outer perimeter of the second section, the two sections divided by a spacer; and
the receptacle component having
a body having a barbed surface along its outer perimeter;
an internal ledge; and an inner diameter for receiving the second section of the insertion component, the inner diameter after the internal ledge being constant in diameter along an entire length of the second barbed surface of the second section ;

wherein the second barbed surface of the second section configured to be manually pushed into the receptacle such that each of a plurality of successive barb layers of the second barbed surface moves past the internal ledge of the receptacle component, such that an upper surface of the receptacle component rests against a bottom surface of the spacer.

14. The fastening device of claim 13, wherein a diameter of the second section of the shaft is smaller than a diameter of the first section of the shaft.

15. The fastening device of claim 14, wherein an outermost diameter of the body of the receptacle component is larger than the diameter of the first section of the shaft.

16. A method of fastening a first substrate to a second substrate using a fastening device,
the fastening device comprising an insertion component and a receptacle component;
the insertion component having
a shaft with two sections, with a first barbed surface along an outer perimeter of the first section and a second barbed surface along an outer perimeter of the second section, the two sections divided by a flange; and
the receptacle component having
a body having a receptacle barbed surface along its outer perimeter, similar to the first barbed surface;
an internal ledge; and
an inner diameter for receiving the second section of the insertion component, the inner diameter after the internal ledge being constant in diameter along an entire length of the second barbed surface of the second section; and
the method comprising,
pushing the first section of the insertion component into a hole in the first substrate, the flange and the second section configured to remain outside the hole in the first substrate,
pushing the receptacle component into a hole in the second substrate, and
engaging the second section into the inner diameter of the receptacle component, such that each of a plurality of surface layers of the second barbed surface is configured to collapse, moving past the internal ledge of the receptacle component, and unfolds, until an upper surface of the receptacle component rests against a bottom surface of the flange.

17. The method according to claim 16, wherein engaging the second section into the receptacle component includes applying manual pressure such that each surface layer of the second barbed surface moves past the internal ledge of the receptacle component for complete engagement.

18. The method according to claim 16, wherein the fastening device is configured to click as each surface layer of the second barbed surface moves past the internal ledge of the receptacle component.

19. The method according to claim 16, wherein the fastening device is configured to emit a sensory indicator as each surface layer of the second barbed surface moves past the internal ledge of the receptacle component.

20. The method according to claim 16, wherein the device fastens the first substrate to the second substrate such that a flex angle of each surface layer of the first barbed surface and the receptacle barbed surface is approximately 45 degrees.

* * * * *